3,386,126
WINDSCREEN WIPERS
Ruben Hadekel, London, England, assignor to Trico
   Products Corporation, Buffalo, N.Y.
Filed Aug. 18, 1965, Ser. No. 480,738
Claims priority, application Great Britain, Aug. 18, 1964,
   33,705/64
4 Claims. (Cl. 15—250.42)

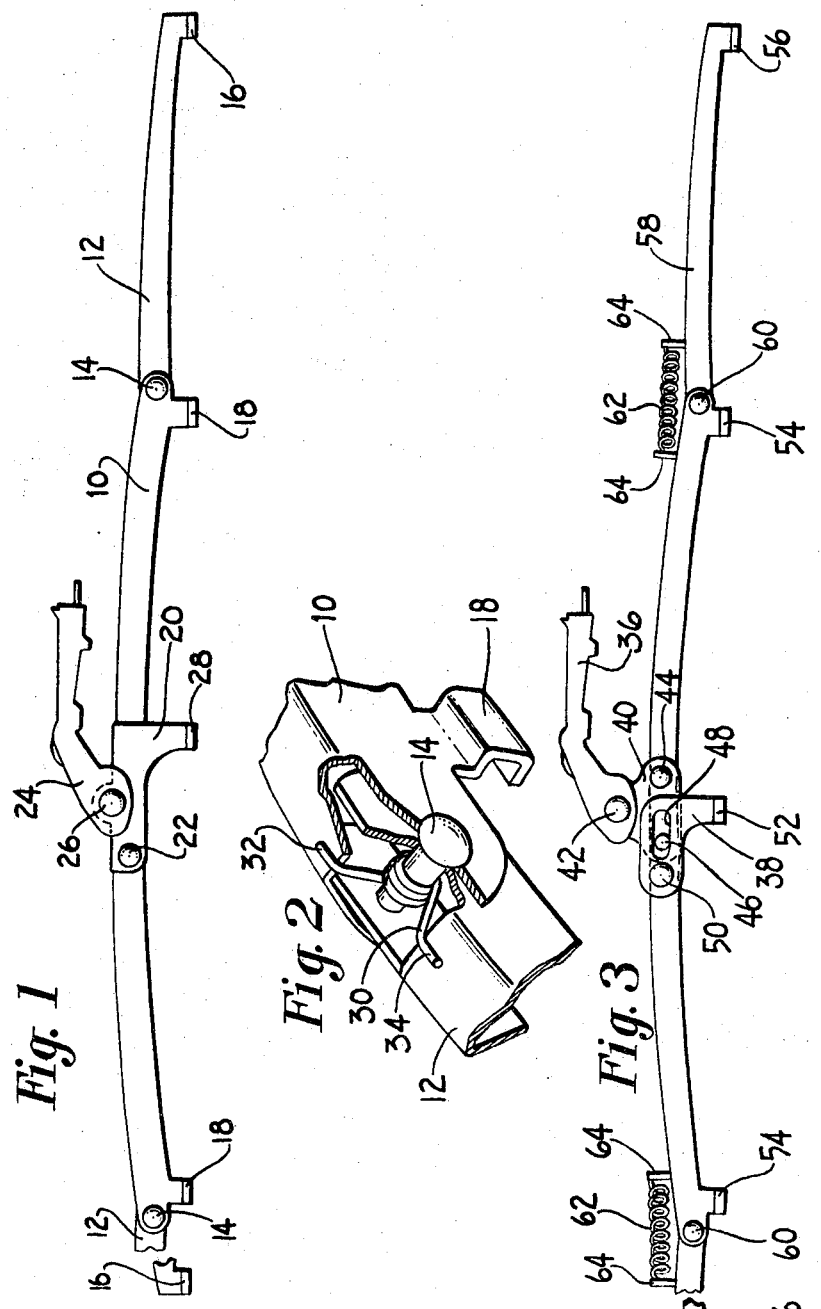

ABSTRACT OF THE DISCLOSURE

A windscreen wiper for distributing proportionate pressure to a single substantially central point close to an arm attachment member through an auxiliary yoke assembly pivoted to the primary yoke. The primary yoke has pressure applying claws secured to the rubber wiper element. A spring biased lever element is secured to each end of the primary yoke with a pressure applying claw secured at each end of the blade.

---

This invention is concerned with the harness of a windscreen wiper blade, that is to say the part which transmits pressure from the wiper arm to the wiping rubber, usually via a backing strip which stiffens the rubber in a plane parallel to the windscreen while permitting it to flex readily into conformity with the varying curvatures of the windscreen.

The harness commonly consists basically of a primary yoke to which the wiper arm is pivoted at a point lying between the ends of the yoke. The ends of the yoke are connected to the rubber or backing strip either directly or via one or more pressure-distributing secondary yokes.

According to the present invention a windscreen wiper harness comprises a primary yoke of which the ends are arranged for attachment either directly or indirectly to a wiping rubber, and a clip or other member for attachment to the end of a wiper arm, the attachment member being pivoted to an auxiliary yoke which is itself pivoted to the primary yoke at a point lying between the ends of the primary yoke and is formed with claws or other means for applying pressure to the rubber at a point close to the attachment member.

The auxiliary yoke must be proportioned so as to transmit the major proportion of the force from the wiper arm to the primary yoke, a smaller proportion of the wiper arm force being transmitted to the rubber or backing strip by the claws or other means on the auxiliary yoke. For example, if it is required to transmit pressure from the harness to the rubber as evenly as possible along the rubber, and if the primary yoke transmits pressure to the rubber at say the ends of the rubber and at two points inwardly spaced from the ends, the auxiliary yoke may be proportioned so as to transmit four fifths of the wiper arm force to the primary yoke and to transmit the remaining one fifth itself to the rubber at the pressure point close to the clip or other attachment member.

Examples of wiper harnesses according to this invention are shown in the accompanying drawings. In these drawings:

FIGURE 1 shows one harness with spring-loaded levers at the end of the primary yoke;

FIGURE 2 is an enlarged fragmentary view showing the springs acting on the levers in FIGURE 1; and FIGURE 3 shows a different harness.

The harness shown in FIGURE 1 has a primary yoke 10 of which the opposite ends carry levers 12 pivoted by means of pins 14. The free ends of the levers are formed with pairs of claws 16 for attachment to a wiper rubber, either directly or through a backing strip, and similar pairs of claws 18 are formed on the ends of the primary yoke.

An auxiliary yoke 20 having sides embracing the primary yoke 10 is pivoted to the primary yoke by means of a pin 22. A clip 24 is pivoted to an upstanding part of the auxiliary yoke by means of a pin 26 and is formed to receive the end of a wiper arm during use. A pair of claws 28 on the auxiliary yoke is connected during use to a wiper rubber and transmits pressure to the rubber at a point close to the clip 24.

It will be appreciated that the distances longitudinally of the harness separating the pin 26 from the pin 22 and from the claws 28, respectively, determine what proportion of the force exerted by the wiper arm on the clip 24 will be transmitted directly or indirectly to a wiper rubber by the claws 28. Preferably, all the five pairs of claws 16, 18 and 28 will be arranged to apply approximately equal pressures on the wiper rubber and this may be accomplished by arranging for the longitudinal distances of the pin 26 from the pin 22 and from the claws 28, respectively, to be in the ratio of 1:4 and by selecting springs 30, surrounding the pins 14, of a suitable strength such that the pressures applied by the pairs of claws 16 and 18 are substantially equal.

FIGURE 2 shows how a torsion spring 30 surrounding the pin 14 urges each lever in the appropriate direction about the pin 14 by having its free ends 32 and 34 respectively engaging the primary yoke and lever.

FIGURE 3 shows a harness having a clip 36 which is pivoted indirectly to an auxiliary yoke 38 via an intermediate short yoke 40. The clip 36 is pivoted to the yoke 40 by means of a pin 42, and the yoke 40 is itself pivoted to the primary yoke by means of a pin 44. By this arrangement, the yoke 40 trnasmits equal forces respectively to the pin 44 and to a pin 46 which extends through a clearance hole (not shown) in the primary yoke and engages in slightly elongated holes 48 in the sides of the auxiliary yoke 38. The pin 46 thus transmits a force to the primary yoke through a pin 50 and to the rubber via claws 52.

The forces transmitted to the primary yoke by the pins 50 and 44 are transmitted to the rubber through pairs of claws 54 and 56 respectively on the primary yoke and on levers 58. The levers 58 are pivoted to the ends of the primary yoke and are urged in the appropriate directions about pivot pins 60 by compression springs 62 acting between upwardly directed tabs 64.

As in the case of the harness shown in FIGURE 1, the harness of FIGURE 3 may have the auxiliary yoke 38 so proportioned that equal forces are transmitted to the rubber by the five pairs of claws 52 to 56, given the appropriate turning moments by the springs 62 on the levers 58. Alternatively, the forces transmitted by the different claws may be varied to suit any particular requirements as regards the pressure distribution along the rubber.

I claim:

1. A windscreen wiper harness comprising a primary yoke of which the ends are arranged for attachment to a wiping rubber, and an attachment member for attachment to the end of a wiper arm, the attachment member being pivoted at a first axis to an auxiliary yoke assembly which is itself pivoted to the primary yoke at a second axis displaced from said first axis lying between the ends of the primary yoke and is formed with means for applying pressure to the rubber at a single point close to the attachment member.

2. A harness according to claim 1 in which the auxiliary yoke assembly comprises an auxiliary yoke to which the attachment member is pivoted directly by means of a pivot pin.

3. A harness according to claim 1 in which the auxiliary yoke assembly comprises an auxiliary yoke and an intermediate short yoke and in which the attachment member is pivoted indirectly to the auxiliary yoke via the intermediate short yoke which is itself pivoted also to the primary yoke.

4. A harness according to claim 1, in which the ends of the primary yoke are formed with claws or other means for connection to a wiper rubber and carry spring-loaded levers for transmitting pressure to the ends of the rubber.

References Cited

UNITED STATES PATENTS

| | | | |
|---|---|---|---|
| 2,706,291 | 4/1955 | Rappl | 15—250.42 X |
| 3,318,664 | 11/1965 | Wise | 15—250.42 |

CHARLES A. WILMUTH, *Primary Examiner.*